T. E. MURRAY.
TUBE FLANGE AND CLAMPING DEVICE THEREFOR.
APPLICATION FILED DEC. 14, 1916.

1,225,478. Patented May 8, 1917.

Inventor
Thomas E. Murray
By his Attorney

UNITED STATES PATENT OFFICE.

THOMAS E. MURRAY, OF NEW YORK, N. Y.

TUBE-FLANGE AND CLAMPING DEVICE THEREFOR.

1,225,478. Specification of Letters Patent. Patented May 8, 1917.

Application filed December 14, 1916. Serial No. 136,864.

*To all whom it may concern:*

Be it known that I, THOMAS E. MURRAY, a citizen of the United States, residing at New York, in the county of New York and State of New York, have invented a certain new and useful Improvement in Tube-Flanges and Clamping Devices Therefor, of which the following is a specification.

The invention is a tube having a flange built up of channeled rings of sheet metal, to which said tube is butt-welded, and also means on said tube for clamping said flange against the similar flange of a second tube, whereby said tubes are coupled together.

In the accompanying drawings—

Figure 2:
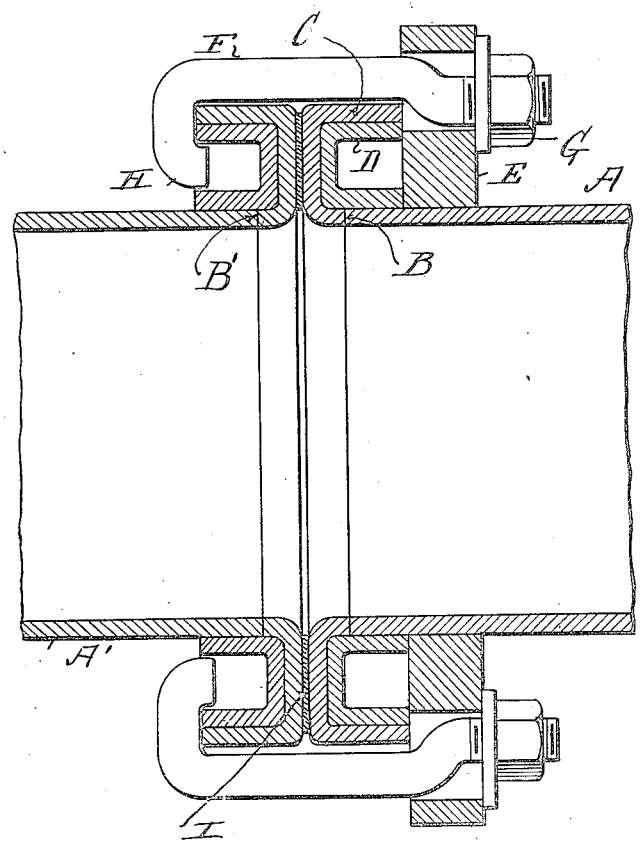
Figure 1:
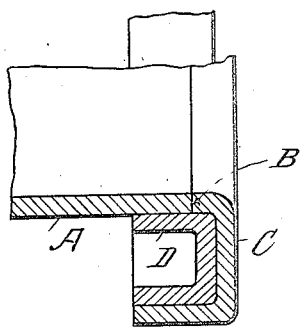

Figure 1 illustrates in section and separately, my flange applied to the end of a tube. Fig. 2 shows the coupling bolts connected to the flange and tube and engaging in the flange of an oppositely placed tube to couple said tubes together.

Similar letters of reference indicate like parts.

The tube A is electrically butt-welded at B to the edge of the inner wall of a sheet metal bent over or struck up channeled ring C. Seated within the ring C is a sheet metal bent over or struck up channeled reinforcing ring D, in which the tube A fits. On the tube A is an annular washer E having openings to receive the bolts F. Corresponding ends of the bolts are threaded to receive nuts G. The opposite extremities of the bolts are turned over to form hooks H.

The rings C, D unitedly form a flange on the end of tube A. In order to couple the flange of tube A to a similar abutting flange of tube A', the hooks H are introduced into the ring D, and the nuts G are set up to cause the bolts to clamp the two flanges B, B' firmly together. A gasket I may be placed between the abutting end faces of the flanges.

I claim:

1. A tube, a channeled ring of sheet metal, the said tube being butt-welded to the edge of the inner wall of said ring, and a channeled ring of sheet metal seated in said first-named ring.

2. A tube, a channeled ring of sheet metal, the said tube being butt-welded to the edge of the inner wall of said ring, a channeled ring of sheet metal seated in said first-named ring, an annular washer of metal on said tube and having openings, bolts hooked at one end and passing through said openings in said washer, and means for setting up said bolts.

In testimony whereof I have affixed my signature in presence of two witnesses.

THOMAS E. MURRAY.

Witnesses:
GERTRUDE T. PORTER,
MAY T. MCGARRY.